(12) United States Patent
Henry

(10) Patent No.: US 10,334,106 B1
(45) Date of Patent: *Jun. 25, 2019

(54) DETECTING EVENTS FROM CUSTOMER SUPPORT SESSIONS

(71) Applicant: ASAPP, INC., New York, NY (US)

(72) Inventor: Shawn Henry, Longmont, CO (US)

(73) Assignee: ASAPP, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,881

(22) Filed: Sep. 7, 2018

Related U.S. Application Data

(63) Continuation of application No. 15/922,662, filed on Mar. 15, 2018, now Pat. No. 10,097,690.

(51) Int. Cl.
| | | |
|---|---|---|
| *H04M 3/00* | (2006.01) | |
| *H04M 5/00* | (2006.01) | |
| *H04M 3/51* | (2006.01) | |
| *G06N 3/04* | (2006.01) | |
| *G06N 3/08* | (2006.01) | |
| *G06F 17/27* | (2006.01) | |

(52) U.S. Cl.
CPC ...... *H04M 3/5183* (2013.01); *G06F 17/2765* (2013.01); *G06N 3/04* (2013.01); *G06N 3/0454* (2013.01); *G06N 3/08* (2013.01)

(58) Field of Classification Search
CPC ...... H04M 3/51; H04M 3/5141; H04M 3/523; H04M 3/5191
USPC ............ 379/265.09, 265.05, 265.01, 265.11, 379/265.13, 265.12, 265.02, 242, 266.01, 379/266.02, 265.14
See application file for complete search history.

(56) References Cited

U.S. PATENT DOCUMENTS

| | | | |
|---|---|---|---|
| 7,730,204 B2 | 6/2010 | Pak | |
| 7,787,609 B1 * | 8/2010 | Flockhart | H04M 3/5233 379/265.01 |
| 9,848,082 B1 | 12/2017 | Lillard et al. | |

OTHER PUBLICATIONS

Blei, et al., "Latent Dirichlet Allocation", Journal of Machine Learning Research, vol. 3, 2003, pp. 993-1022.
Card, et al., "A Neural Framework for Generalized Topic Models", arXiv:1705.09296v1 [stat.ML], https://arxiv.org/pdf/1705.09296.pdf, May 25, 2017, 11 pages.

(Continued)

*Primary Examiner* — Thjuan K Addy
(74) *Attorney, Agent, or Firm* — GTC Law Group PC & Affiliates

(57) ABSTRACT

Text of customer support sessions of a company may be processed to detect events that are taking place. For example, an event may be a service disruption. The company may desire to detect the events and take action to address them. The events may be detected by processing customer support sessions during a time window and computing counts, where each count corresponds to a topic and a customer parameter. The topics may be determined from the customer support sessions and the customer parameters may relate to information about the customer (e.g., services received by the customer). Baseline counts may also be computed that correspond to typical or expected behavior when no event is occurring. Event detection scores may be computed by processing the counts and baseline counts and used to determine if an event has occurred. The process may be repeated for subsequent time windows.

20 Claims, 10 Drawing Sheets

(56) References Cited

OTHER PUBLICATIONS

Kingma, et al., "Auto-Encoding Variational Bayes", arXiv:1312.6114v10 [stat.ML], https://arxiv.org/pdf/1312.6114.pdf, May 1, 2014, 14 pages.
Kulldorff, "A Spatial Scan Statistic", Commun. Statist. Theory Meth., vol. 26, iss. 6, 1997, pp. 1481-1496.
Maurya, et al., "Semantic Scan: Detecting Subtle, Spatially Localized Events in Text Streams", arXiv:1602.04393v1 [cs.IR], https://arxiv.org/pdf/1602.04393.pdf, Feb. 13, 2016, 10 pages.
Wang, et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.

* cited by examiner

| Customer Parameters | $T_1$ | $T_2$ | $T_3$ | ... | $T_N$ |
|---|---|---|---|---|---|
| Current Customer | 101 | 221 | 118 | ... | 163 |
| Cable Subscriber | 34 | 28 | 11 | ... | 22 |
| Phone Subscriber | 19 | 21 | 7 | ... | 2 |
| Internet Subscriber | 90 | 211 | 125 | ... | 96 |
| Zip Code 12345 | 13 | 18 | 17 | ... | 19 |
| Zip Code 12346 | 18 | 9 | 14 | ... | 23 |
| Modem Model Z24 | 8 | 201 | 3 | ... | 7 |
| Modem Model X74 | 2 | 24 | 7 | ... | 3 |
| Invoice Past Due | 14 | 4 | 9 | ... | 2 |
| ... | ... | ... | ... | ... | ... |

Fig. 7

| Customer Parameters | Value |
|---|---|
| Current Customer | True |
| Cable Subscriber | False |
| Phone Subscriber | False |
| Internet Subscriber | True |
| Zip Code 12345 | True |
| Zip Code 12346 | False |
| Modem Model Z24 | True |
| Modem Model X74 | False |
| Invoice Past Due | False |
| ... | ... |

Fig. 6

DETECTING EVENTS FROM CUSTOMER SUPPORT SESSIONS

CLAIM OF PRIORITY

This patent application is a continuation of U.S. patent application Ser. No. 15/922,662 filed on Mar. 15, 2018. The content of the foregoing application is hereby incorporated by reference in its entirety for all purposes.

FIELD OF THE INVENTION

The present invention relates to processing text of customer support sessions to determine the occurrence of an event.

BACKGROUND

Companies interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

In some situations, events may occur that impact a large number of customers or otherwise have a significant impact on the business of a company. For example, telecommunication wires may be cut by a fallen tree, a newly released product may be failing or operating incorrectly, or a software update may cause products or services to work incorrectly. While the company may receive individual reports from customers via customer support sessions (e.g., either automated or with a customer service representative), the company may not be able to appreciate that a significant event has occurred. Presently known systems make it difficult to efficiently process a large number of customer support sessions, and to be able to process, communicate, and store aggregated groups of customer support sessions. Additionally, presently known systems make it difficult to be able to quickly determine when such events occur so that the company may implement a solution to fix the event, provide a timely response to the media or to customers, or determine times related to the event to assist in trouble-shooting, corrective action, or liability management.

BRIEF DESCRIPTION OF THE FIGURES

The invention and the following detailed description of certain embodiments thereof may be understood by reference to the following figures:

FIG. 6 is an example list of possible customer parameters.

FIG. 7 is a representation of counts computed from a group of customer support sessions.

DETAILED DESCRIPTION

Figure 2:
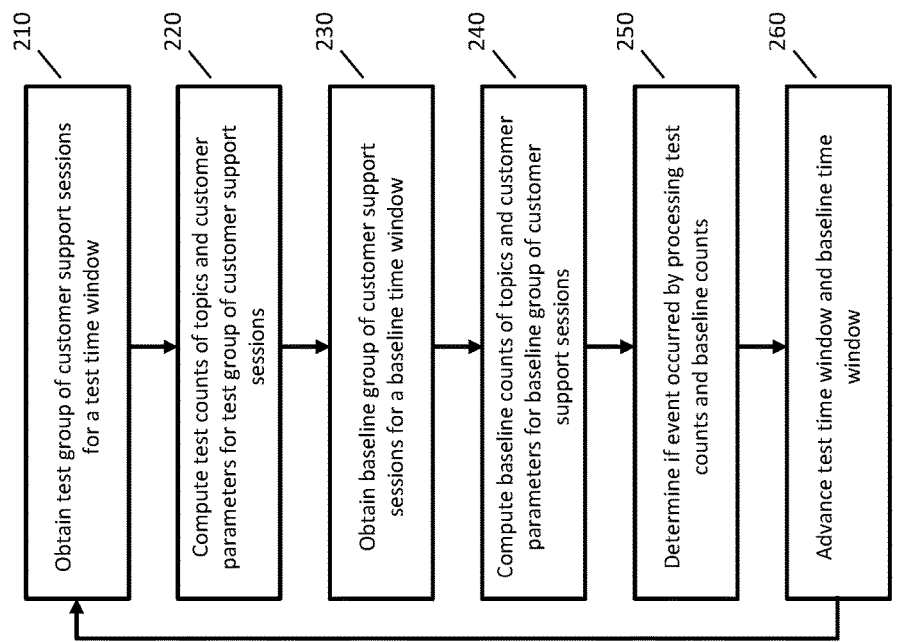
FIG. 2 is a flowchart of an example implementation of sequentially processing test groups and baseline groups of customer support sessions to detect events.

Described herein are techniques to allow a company to process text of customer support sessions to detect events that impact the company or somehow relate to the business of the company. Any appropriate events may be detected. For example, some events may relate to faults in products or disruptions in services to customers, where the company desires to detect and fix these events quickly to reduce the impact on customers. Other types of events may relate to customers expressing praise for a new product or service during customer support sessions.

Certain embodiments of the present disclosure include technical advances to improve the technological field of detecting and identifying the occurrence of events in response to text of customer support sessions. Events as utilized herein can include any event of interest to an entity (e.g., a company) interacting with customer support sessions, including events which have a beneficial business impact, a negative business impact, a regulatory compliance impact, a service delivery impact, a reputational impact, and/or any other type of event. For example, and without limitation, example events include a product related event (e.g., defects; problems; bugs; customer impressions; service, maintenance, or wear related events; sales volume indications; and/or changes in any of the foregoing); a service related event (e.g., service delivery issues; indication that a service delivery quality may be below, above, or changing relative to a service quality target and/or service level agreement; indications that a new problem related to the service has arisen, and/or that a previous problem related to the service has been fixed), events related to customer interactions (e.g., a change in tone or term usage of customer support sessions), and/or events related to external matters of interest to the entity (e.g., customer support sessions indicating one or more of: a regulatory compliance issue may have arisen; a product safety issue may have arisen; social media activity related to the entity, a product, or a service; a reputational impact to the entity, a product, or a service; a potential data breach may have arisen relating to the entity; and/or a liability impacting issue may have arisen related to the entity, a product, or a service).

The rise in the information age of rapid interactions between customers and the media, high expectations of service and product performance by customers, the availability of customers to interact with a large audience (e.g., through the internet, social media, have greatly increased the risks and costs of event occurrences relating to products, services, and entity reputation events. Pressures to reduce time and costs in customer service interactions, both for providing a superior customer service interaction and to improve financial impacts to the business, provide for an environment where customer service representatives have reduced time to interact with customers and increased the utilization of automated services as part of the customer service experience. Additionally, product and service volumes are increasing and may be widely distributed (e.g., globally), which necessitates that individual customer service representatives observe a smaller fraction of a total number of customer service interactions. Accordingly, recent and continuing changes in the technological field of customer service support are driving specific challenges to determining when a risk or opportunity has occurred or is developing, and increasing the consequences of delay in identifying the occurrence of or the developing risk or opportunity incident to an event.

The company may continuously monitor data relating to customer support sessions to detect the presence of anomalies in the customer support sessions for the purpose of detecting events. To detect anomalies, the company may compute baseline counts that describe typical behavior or patterns of customer support sessions. On regular test time intervals, such as every 15 minutes or one hour, the company may compute test counts that describe customer support sessions during that test time interval. Where a test count deviates too far from a corresponding baseline count, and/or where a test count experiences a rate of change (e.g., relative to a baseline count rate of change) the company may determine that an event has occurred. The terms test count and baseline count should be understood broadly, and include at least counted parameters (e.g., occurrences of a term, occurrences of a customer support session having a particular behavior, etc.), rates of change of counted parameters, weighted counts or rates of change (e.g., where a given term and/or type of customer support session is given more weight than another term or type of customer support session toward a given event), persistence values (e.g., integrated count values, a count value exceeding a threshold for a period of time and/or for a number of tests, etc.), and/or hysteresis on a counted parameter (e.g., a first threshold to determine an event has occurred, and a second threshold distinct from the first threshold to determine the event is no longer occurring).

If the company determines that an event has occurred, the company may provide a description or explanation of the event to a person, provide an alert or notification of the event to a display device, and/or log the event for later processing. In some implementations, the response to the event detection is determined in response to the type of event—for example notifying a service or troubleshooting team, a media response team or media representative, a legal representative, a technical team, etc. according to the type of event and/or a predetermined protocol. Accordingly, it can be seen that events can be detected more quickly than in previously known systems, and responses such as corrective action, risk mitigation, problem solving, and/or actions to take advantage of a market opportunity can be implemented more quickly, minimizing the risks and maximizing the opportunities. Additionally, it can be seen that events can be detected more reliably: the disclosed systems and methods can operate systematically on a high resolution and large data set (e.g., all of the available customer support session data, and/or a sampled amount of the available customer support session data); and the disclosed systems and methods can operate in real-time or on very recent data (e.g., less than 5 minutes old, less than 15 minutes old, and/or less than one hour old) that is highly relevant to evolving events and responsive to rapidly developing events.

The techniques described herein may use two different types of data for computing baseline counts and test counts.

The first type of data is topics of customer support sessions. The topics of customer support sessions may be learned or discovered from text of the customer support sessions. For example, the customer support sessions may be clustered into topics relating to requesting new services, cancelling existing services, changing an address, paying bills, or requesting help with a malfunctioning product.

The second type of data is customer parameters relating to the customer of the customer support session or the customer support session itself. The customer parameters may include any information available to the company that relates to the customer or the session, such as the products or services received by the customer, the duration of time the customer has been a customer of the company, whether the customer's bill is past due, a model of a product used by the customer, or the location of the customer (e.g., a zip code).

By tracking both types of data, a company may be able to detect relevant events. For example, for modem model Z24, a baseline rate of customer support sessions of customers who have this modem with topics relating to malfunctioning equipment may be 0.02%. For a test time interval, the company may determine that the rate of customer support sessions with these characteristics is 6.1%. The processing of the baseline and test rates may detect that an event has occurred, and in response, an action may be taken to respond to the event. For example, a person at the company may receive the notification, determine that a software update that was just deployed likely caused the event, and cause the software update to be reversed. In this manner, the company may quickly detect an event that impacts customers and provide a fix.

The techniques described herein may be performed by a company to detect events from its own customer support logs. In addition, the techniques described herein may be performed, at least in part, by a third-party company who is providing services to multiple companies. For example, the third-party company may obtain access to a company's customer support logs and process those logs to determine when an event has occurred.

Figure 1:
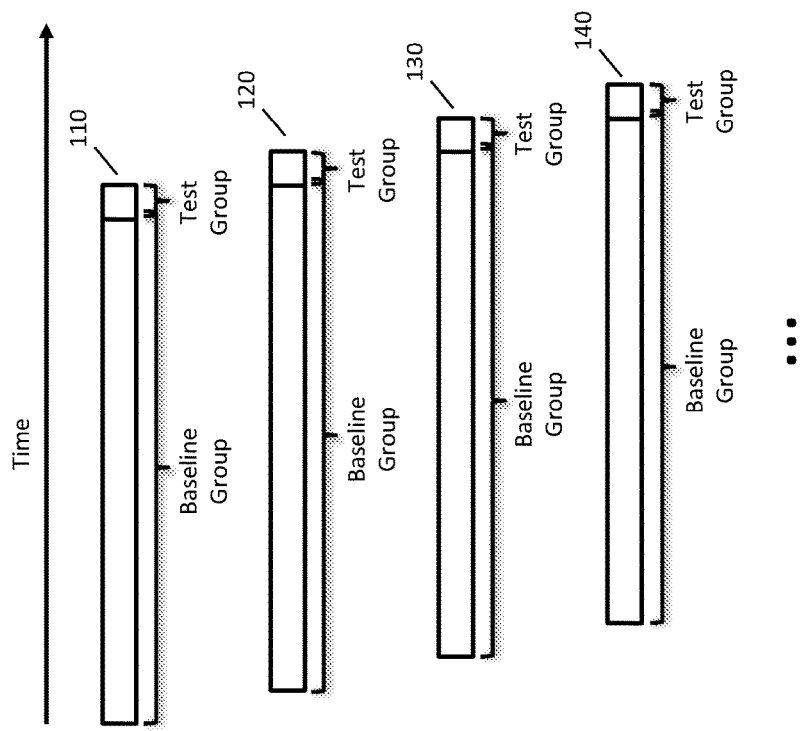
FIG. 1 is a representation of test groups and baseline groups of customer support sessions that may be used for detecting events.

FIG. 1 illustrates a timeline of processing test groups of customer support sessions and a baseline group of customer support sessions in a sequence of time windows, and FIG. 2 is a flowchart of an example implementation of detecting events by processing the groups of customer support sessions. The term time window as utilized herein should be understood broadly, and can include other groupings for a number of customer support sessions, and/or variations in the time windows. For example, in some implementations, groups of customer support sessions may be bucketed into time domain windows such as every 5 minutes, every 15 minutes, and/or every hour. Data from customer support sessions in a time window are processed together as a group in the example. In some implementations, the time window selected may be varied throughout operations of the systems and methods herein, for example using smaller time windows during busy periods, during periods that may be known to be more likely to generate an event (e.g., right after a new product release, a patch or update, a holiday period, etc.). In some implementations, the time window may be varied in response to processing operations—for example if an event is not detected but a count value in increasing, the time windows may be reduced (e.g., to provide for more rapid response) or increased (e.g., to increase confidence in event checking). In some implementations, a time window may be a number of customer support sessions (e.g., bucketing every 10 customer support sessions, every 100 customer support sessions, every 1000 customer support sessions, or some other number into a "time window"), a number of specified contributing (e.g., having a predetermined topic value and/or customer parameter value, utilization of a term of interest, etc.) customer support sessions (e.g., bucketing the currently monitored customer support sessions every 5 contributing customer support sessions, every 10 contributing customer support sessions, every 25 customer support sessions, or some other number, into a "time window"). Any of the described examples of a time window can include overlapping customer support sessions between groupings in separate time windows. The described examples of a time window are non-limiting examples, and any other operations to group batches of customer support sessions, and/or combinations of these, are contemplated herein.

In FIG. 2 and other flowcharts herein, the ordering of the steps is exemplary and other orders are possible, not all steps are required, steps may be combined (in whole or part) or sub-divided, and, in some implementations, some steps may be omitted or other steps may be added. The methods described by any flowcharts herein may be implemented, for example, by any of the computers or systems described herein.

At step 210 of FIG. 2, a test group of customer support sessions from a test time window is obtained. For example, for a first iteration of FIG. 2, the test group of customer support sessions may correspond to the test group of first windows 110. Any appropriate time window may be used, such as a 15-minute window or a one-hour window. In some implementations, the time window may end close to the current time so that the time window corresponds to recent customer support sessions. The test group may correspond to some or all of the customer support sessions of the test time window.

At step 220, test counts are computed where each test count of the test counts corresponds to a topic and a customer parameter. In some implementations, the test counts may be a matrix of test counts where the rows of the of matrix correspond to customer parameters and the columns correspond to topics. As explained in greater detail below, for a first customer support session, test counts may be incremented that correspond to (i) the topic of the first customer support session and (ii) customer parameters corresponding to the first customer support session.

At step 230, a baseline group of customer support sessions from a baseline time window is obtained. In some implementations, the baseline time window may be much longer than the test time window to capture typical patterns in customer support sessions. The baseline time window may or may not be adjacent to the test time window, and the baseline group may correspond to some or all of the customer support sessions of the baseline time window.

At step 240, baseline counts are computed where each of the baseline counts corresponds to a topic and a customer parameter. The baseline counts may be computed in a similar manner as the test counts as described in greater detail below.

At step 250, it is determined if an event has occurred by comparing the test counts with the baseline counts. If a test count deviates too far from a corresponding baseline count (after appropriate normalization), then it may be determined that an event has occurred. In some implementations, a matrix of event detection scores may be computed where each event detection score is computed from corresponding test counts and baseline counts. It may be determined that an event has occurred if any of the event detections scores is larger than a threshold, and/or if certain subsets of the event detection scores are larger than a threshold. If it is determined that an event has occurred, then the event may be logged or a notification may be transmitted so that an action may be performed in response to the event.

At step 260, the test time window is advanced so that more recent customer support sessions may be processed. For example, the advanced test time window may correspond to the test group of second windows 120. The advanced time window may or may not overlap the previous time window. For example, the width of the test time window may be one hour, and the test time window may be advanced in 15-minute increments or in one-hour increments.

In some implementations, the baseline time window is also advanced, such as by the same increment as the test time window. In some implementations, the baseline time window may be advanced less frequently, such as once a day.

After step 260, processing may proceed back to step 210 where the steps are repeated for the new time windows. The steps of FIG. 2 may similarly be repeated for third windows 130, fourth time windows 140, and so forth.

By performing the processing of FIG. 2, a company may be able to detect events in real time or in near real time, such as within 15 minutes of the event occurring. In some implementations, the computations steps of FIG. 2 may be performed quickly so that it may be determined whether an event has occurred in a first test time window before starting to process a second test time window.

Figures 3A, 3B:
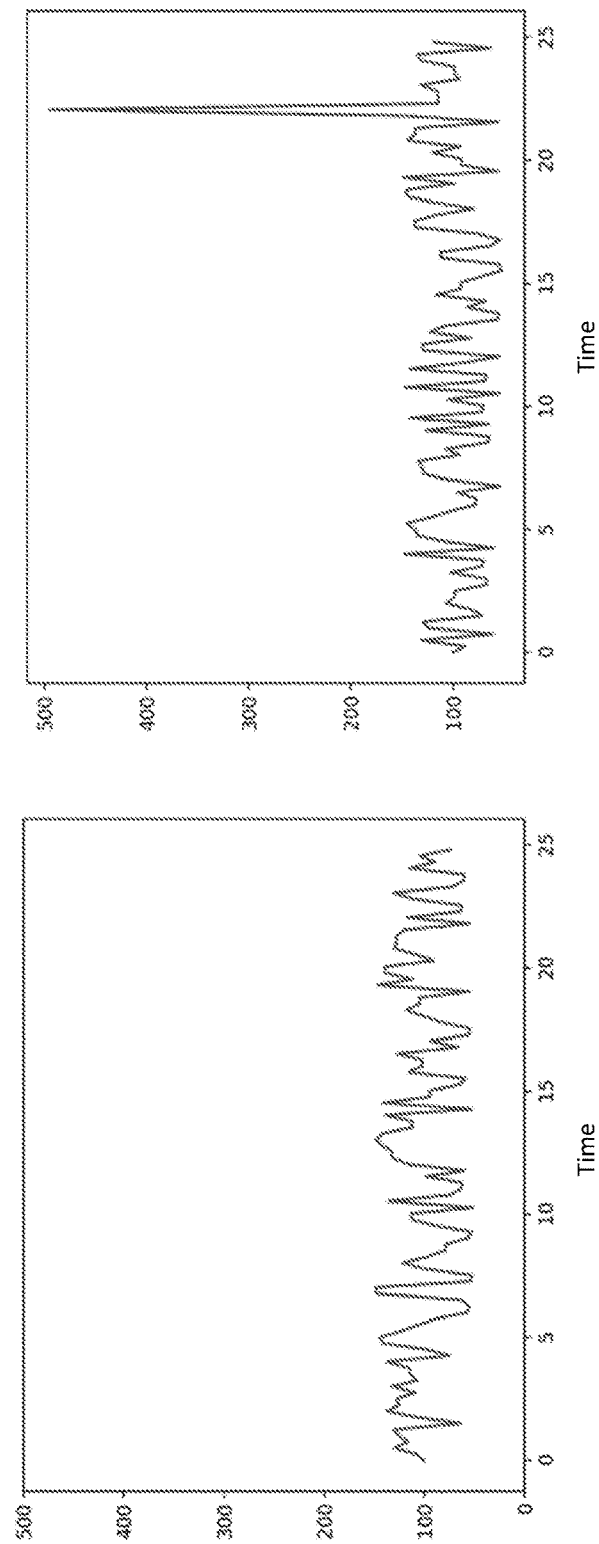
FIGS. 3A and 3B are representations of event detection scores over time.

FIGS. 3A and 3B are plots of example of event detection scores over time. For each test time window, a number of event detections scores may be computed, such as a matrix of event detection scores as described above. FIG. 3A plots a first event detection score over time from successive time windows. In the example of FIG. 3A, the first event detection score does not include any significant changes, and thus no events may be detected from the first event detection score. FIG. 3B plots a second event detection score over time. In this example, the second event detection score increases significantly at time 22 and may indicate that an event has occurred.

Topics of Customer Support Sessions

Each customer support session may be associated with one or more topics, such as technical support, billing, or requesting an additional service. A group of customer support sessions may be processed to identify, learn, or discover the topics that are present in the group of customer support sessions. Because the topics are identified from the sessions, the topics may be referred to as latent topics.

In some implementations, an identified topic may be represented as a distribution of words in a vocabulary of words. A total vocabulary of words may be specified, such as a list of 50,000 most common words in customer support sessions. After each topic is learned, the topic may be represented as a topic vector with the same length as the vocabulary, where each element of the vector indicates a frequency with which the corresponding word appears in the topic. The values of the topic vector may be represented using a logarithmic scale to improve the numerical accuracy of the representation.

The number of topics may be a parameter that is specified in advance, such as 100 topics, and the group of customer support sessions may be processed to identify 100 topics that are present in the group, where each topic may be represented by a topic vector as described above.

Each customer support session may be associated with one or more topics. In some implementations, each customer support session may be associated with a single topic, such as by selecting a topic whose topic vector is, in a sense, closest to the customer support session. In some implementations, a customer support session may be associated with more than one topic, such as 75% related to technical support and 25% related to billing. The topics of a customer support session may be represented as a topic distribution vector, where the length of the vector is the same as the number of topics, and the values indicate a match between the customer support session and each of the topics. The topic distribution vector may be normalized so that it sums to one.

In some implementations, it may be desired to compute topics for a group of customer support sessions quickly. For example, in some implementations, it may be desired to compute topics for a group of customer support sessions for each iteration of FIG. 2. A topic model that is implemented using neural networks may be able to compute topics for a group of customer support sessions more quickly than other techniques for computing topics, such as latent Dirichlet allocation. Although any techniques for computing topics may be used in conjunction with the techniques described herein, now described is an example of a topic model that uses a neural network that is able to compute topics of a group of customer support sessions quickly.

For clarity of presentation in the following explanations, learning topics of a group of documents will be described. Each document may correspond to a customer support session, such as some or all of the text transmitted between the customer and the company during the customer support session.

In some implementations, a topic model may be implemented using a variational auto-encoder. A variational auto-encoder topic model may process a group of documents to learn topics of the documents and also compute a topic distribution for each document. The topic model may be trained by iterating over the documents in the group of documents. In the following the size of the vocabulary of words is denoted as V, the number of topics is denoted as K, and the hidden size of the neural networks is denoted as D.

Each document may be represented as a feature vector, such as a bag of words vector. A bag of words vector may have length V, where each element of the vector indicates the number of times the corresponding word appears in the document. The vector may be normalized so that it sums to one.

The feature vector for the document may be processed with a first neural network to compute an encoder vector that represents the document. Any appropriate neural network may be used, such as a multi-layer perceptron. For example, the encoder vector may be computed as $$h_{enc} = \phi(W_{enc} x + b_{enc})$$

where x is the feature vector of the document, $h_{enc}$ is the encoder vector of length D, $\phi$ is a non-linearity such as a hyperbolic tangent or a rectified linear unit, $W_{enc}$ a matrix of parameters, and $b_{enc}$ is a vector of parameters.

In some implementations, the encoder vector may be computed using a residual connection as $$h_{enc} = \phi(W_{enc} x + b_{enc}) + W_{res} x + b_{res}$$

where $W_{res}$ is a matrix of parameters, and $b_{res}$ is a vector of parameters.

After computing the encoder vector, it may be used to compute parameters of a probability distribution. Any appropriate techniques may be used to determine the parameters of a probability distribution, such as by computing mean and variance vectors as follows:

$$\mu = W_\mu h_{enc} + b_\mu$$

$$\sigma^2 = \exp(W_{\sigma^2} h_{enc} + b_{\sigma^2})$$

where $W_\mu$ and $W_{\sigma^2}$ are matrices of parameters and $b_\mu$ and $b_{\sigma^2}$ are vectors of parameters.

A probability distribution with the computed parameters is then sampled. Any appropriate probability distribution may be used, such as a Normal or Gaussian distribution having the computed mean and variance. For example, a Normal distribution may be sampled as follows:

$$z = N(\mu, \sigma^2)$$

The sample of the probability distribution may then be processed with a second neural network to compute a decoder vector. Any appropriate neural network may be used, such as a multi-layer perceptron. For example the decoder vector may be computed as $$h_{dec} = \phi(W_{dec} z + b_{dec})$$

where z is the sample of the probability distribution, $h_{dec}$ is the decoder vector of length K, $\phi$ is a non-linearity such as a hyperbolic tangent or a rectified linear unit, $W_{dec}$ is a matrix of parameters, and $b_{dec}$ is a vector of parameters.

In some implementations, the decoder vector may be computed using a residual connection as $$h_{dec} = \phi(W_{dec} z + b_{dec}) + z$$

In some implementations, the vector $h_{dec}$ may be considered to be an estimate of the topic distribution vector for the document being processed. The length of $h_{dec}$ is the same as the number of topics, and each element of $h_{dec}$ may be a log probability that the document is a match to the corresponding topic.

The K topics have not yet been specified, and the specification of the topics may be represented as a matrix $W_{top}$ where there are K rows for the topics and V columns for the words of the vocabulary. Each column of $W_{top}$ may indicate the probability that words of the vocabulary appear in a document of that topic.

A probability distribution of the words of the document may be computed as follows:

$$p = \text{softmax}(W_{top} h_{dec} + b_{top})$$

where $W_{top}$ is a matrix of parameters and $b_{top}$ is a vector of parameters. In some implementations, $b_{top}$ may be initialized as the empirical unigram distribution of words in the vocabulary.

Since $h_{dec}$ represents the distribution of topics in the document and $W_{top}$ represents the distribution of words in each topic, their product represents the distribution of words in the document.

Accordingly, the input to the above processing was a bag of words or count of the words in the document, and the output of the above processing is an estimate of a probability distribution of the words in the document. The parameters of the above processing may be optimized so that the estimated probability distribution for the words of the document converge to the actual distribution of words in the document. By performing such processing for all the documents in the training corpus, the parameters of the above processing will converge to learn the topics of the documents in the training corpus as represented by the matrix $W_{top}$.

Any appropriate techniques may be used to optimize the above parameters. In some implementations, the parameters may be optimized by minimizing the error lower bound using stochastic gradient descent.

Any appropriate objective function may be optimized. In some implementations, the objective function may have three terms: (i) a term to minimize the difference between the estimated word probabilities of a document and the actual words of the document, (ii) a term to minimize the Kullback-Leibler divergence between the parameters of the probability distribution and a standard normal distribution, and (iii) a term to enforce a sparsity constraint on the matrix of topics $W_{top}$.

The first term may be represented as $$loss_{nll} = -x^T \log p$$

where $loss_{nll}$ indicates the negative log-likelihood for the difference between the word counts of the document and the estimated probability distribution of the words in the document.

The second term may be represented as $$loss_{kld} = \frac{1}{2}\sum_{i=1}^{K} \mu_i^2 + \sigma_i - \log \sigma_i - 1$$

where $loss_{kld}$ indicates Kullback-Leibler divergence between a standard normal distribution and a normal distribution having mean vector $\mu$ and variance vector $\sigma$, $\mu_i$ is the $i^{th}$ element of the $\mu$ vector, and $\sigma_i$ is the $i^{th}$ element of the variance vector $\sigma$.

The third term may be represented as $$loss_{spw} = \lambda \|W_{top}\|_1$$

where the third term is the $l_1$ norm of the matrix $W_{top}$ modified by the parameter $\lambda$.

Accordingly, the objective function for the optimization may be represented as $$loss = loss_{nll} + loss_{kld} + loss_{spw}$$

In some implementations, the parameter $\lambda$ may be updated during the optimization process to obtain a desired sparsity level. For example, $\lambda$ may be updated according to the following equation:

$$\lambda = \lambda * 2^{t-s}$$

where t represents a desired sparsity level and s is a measured sparsity level after a previous iteration. The measure sparsity level may be obtained, for example, by determining the proportion of values of $W_{top}$ that are less than a threshold (e.g., $10^{-3}$).

The corpus of documents may be processed iteratively until a convergence criterion has been attained. Any appropriate techniques may be used for processing the corpus of training documents and optimizing the parameters. In some implementations, the corpus of training documents may be processed in batches, and the parameters may be optimized after processing each batch. At the conclusion of the training process, the output of the training process is the matrix of topics $W_{top}$ and the topic distribution for each document, denoted as $h_{dec}$ above. In some implementations, parameters of the topic model may be retained to compute topic distributions for customer support sessions outside of the training corpus, as described in greater detail below.

Figure 4:
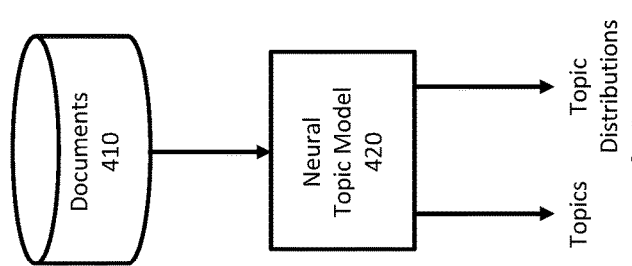
FIG. 4 is an exemplary system for processing a corpus of documents to identify topics.

FIG. 4 illustrates an example system for processing a corpus of documents to identify the topics in the documents and the topic distribution for each of the documents in the training corpus. In FIG. 4, the corpus of documents is stored in documents data store 410. The documents may be stored in any appropriate format, such as each document representing the text of a customer support session. Neural topic model component 420 processes the corpus of documents to output the learned topics and topic distribution for each of the documents in the corpus. Neural topic model component 420 may be implemented using any of the techniques described above.

Figure 5:
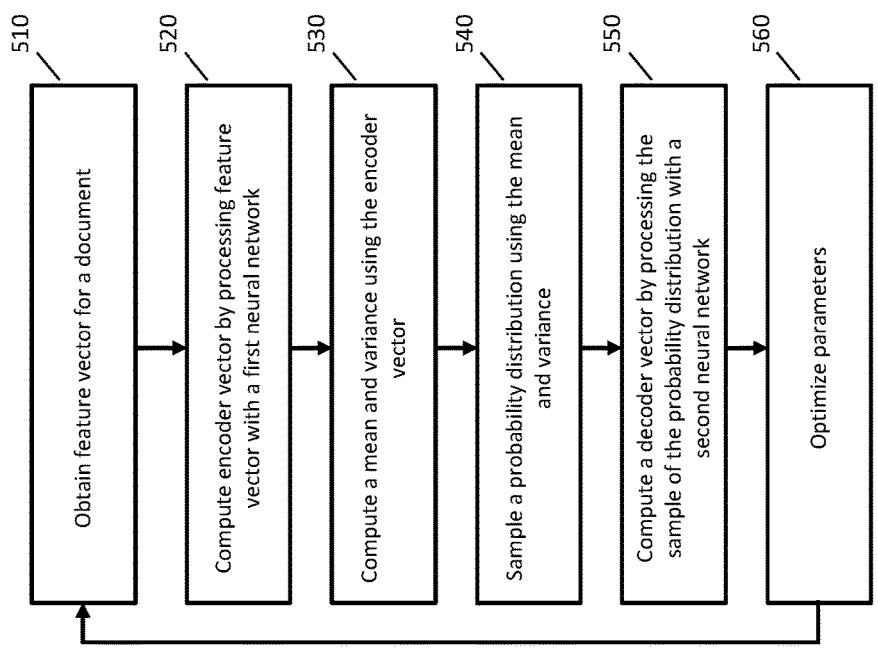
FIG. 5 is a flowchart of an example implementation of identifying topics from a corpus of documents.

FIG. 5 is a flowchart of an example implementation of learning topics from a corpus of documents.

At step 510, a feature vector for a document is obtained, such as a bag of words vector or a count of the words in the document. The document may be from a corpus of documents, such as the document representing text of a customer support session and the corpus representing a group of customer support sessions.

At step 520, an encoder vector is computed by processing the feature vector with a first neural network. The first neural network may be any appropriate neural network, such as a multi-layer perceptron.

At step 530, a mean and variance is computed from the encoder vector. For example, the mean may be a mean vector of a normal distribution and the variance may be a covariance matrix or a vector of variances of a normal distribution. The mean and variance may be computed using any appropriate techniques, such as by computing a linear or affine transform of the encoder vector.

At step 540, a probability distribution is sampled where the probability distribution is specified using the mean and variance computed at step 530. For example, the probability distribution may be normal distribution with a specified mean and variance.

At step 550, a decoder vector is computed by processing the sample of the probability distribution with a second neural network. The second neural network may be any appropriate neural network, such as a multi-layer perceptron.

At step 560, the parameters are optimized by minimizing an objective function, such as the objective function specified above. Any appropriate techniques may be used to minimize the objective function, such as by processing a batch of documents and performing step 560 after processing the batch of documents.

After step 560, processing proceeds to step 510 to process another document in the corpus. This process may proceed until all documents in the corpus are processed, and the documents in the corpus may be processed multiple times. Upon achieving a convergence criterion, the process may be stopped to obtain the topics and the topic distribution of the documents as described above.

Background and Foreground Topics

In some implementations, topics may be determined in two different stages and referred to as background topics and foreground topics. The background topics may represent topics identified by processing data spanning a long period of time, and may represent expected topics during typical customer support sessions when no events are occurring. The background topics may be computed using any appropriate group of customer support sessions, and this group may be different from the baseline group and the test group. The foreground topics may be computed to capture topics that are present in the test group of customer support sessions but not represented in the background topics. For example, when an event occurs, the test group may include topics relating to the event that are not present in the background topics. The background and foreground topics may be used, for example, in the processing of FIG. 2.

The background topics may be computed from any appropriate group of customer support sessions. In some implementations, the background topics may be computed relatively infrequently. For example, the background topics may be computed from a year's worth of customer support sessions and updated once a month. In this example, many iterations of FIG. 2 may use the same background topics, such as when an iteration of FIG. 2 is performed every 15 minutes and the background topics are updated once a month. In some implementations, the background topics may be computed relatively frequently. For example, the background topics may be computed during each iteration of FIG. 2.

The background topics may be computed using any appropriate techniques. In some implementations, the background topics may be computed using a neural topic model, such as any of the neural topic models described above. In some implementations, the background topics may be computed using other techniques, such as latent Dirichlet allocation.

The foreground topics may also be computed using any appropriate group of customer support sessions. For example, the foreground topics may be computed by processing the test group of customer support sessions from FIG. 2. The foreground topics may be computed using any appropriate techniques. In some implementations, the foreground topics may be computed using a neural topic model, such as any of the neural topic models described above. In some implementations, the foreground topics may be computed using other techniques, such as latent Dirichlet allocation.

In some implementations, the foreground topics may be computed by extending the background topics by adding topics that are present in the test group of customer support sessions. For example, a software update may cause modem model Z24 to malfunction and many customers may request support for this problem. The background topics may not include a topic relating to modems malfunctioning, but the foreground topics may capture this topic from the test group.

Any appropriate techniques may be used to expand a set of background topics with foreground topics from a test group of customer support sessions. In some implementations, the foreground topics may be identified using a neural topic model as described below.

Denote the number of background topics as K and the number of foreground topics as K'. The K background topics may be determined from a baseline group of documents (e.g., customer support sessions) using any of the techniques described above, such as a neural topic model. The K' foreground topics may be determined by modifying the neural topic model.

When computing the topics with a neural topic model, the specification of the topics is represented by the matrix $W_{top}$.

In computing the foreground topics, we are computing K' new foreground topics and keeping the K background topics. The topic matrix in computing the foreground topics may thus be represented as $$W_{top} = [W_{top}^{back} W_{top}^{fore}]$$

where $W_{top}^{back}$ is the topic matrix determined when computing the background topics with K columns for the topics and V rows for the words of the vocabulary, and $W_{top}^{fore}$ is the topic matrix to be computed for the foreground topics with K' columns for the topics and V rows for the words of the vocabulary. In computing the foreground topics, $W_{top}^{fore}$ is updated but $W_{top}^{back}$ does not change.

Processing the test group of documents proceeds as indicated above except that the computations are modified to maintain the background topics. When computing the probability distribution of the words in the document $$p = \text{softmax}(W_{top} h_{dec} + b_{top})$$

the topic matrix may be split into two matrices for the background and foreground topics as follows $$p = \text{softmax}([W_{top}^{back} W_{top}^{fore}] h_{dec} + b_{top})$$

In performing the optimization step, the parameters of $W_{top}^{fore}$ are are updated and the parameters of $W_{top}^{back}$ are fixed.

At the conclusion of processing the test group of documents, the output is the matrix of topics $W_{top}^{fore}$ and the topic distribution for each of the test documents, denoted as $h_{dec}$ as indicated above. The background topics $W_{top}^{back}$, the foreground topics $W_{top}^{fore}$, and the topic distributions of the test documents may then be used to detect events as described in greater detail below.

Customer Parameters

Customer parameters may also be used to identify events. Customer parameters may include any information about a customer or session that may be available to a company. For example, customer parameters may include whether the customer is a current customer (as opposed to a former customer), the services received by the customer, products purchased by the customer, the duration of time since the customer became a customer, whether the customer has a past due invoice, and the location of the customer.

In some implementations, the customer parameters may include other information that relate to a customer support session with a customer, but may be indirectly related to the customer. For example, customer parameters may include a time of a customer support session, a day of the week of a customer support session, or the weather (e.g., temperature or whether it was raining) during a customer support session.

The customer parameters may be represented in any appropriate format. In some implementations, the customer parameters may be represented as boolean value. For example, there may be a customer parameter for each service provided by the company, and the value may be true or false corresponding to whether the customer receives the service. For another example, there may be a customer parameter for each zip code that is true or false depending on whether the customer lives in that zip code.

FIG. 6 is an example list of possible customer parameters, with example values of the customer parameters for a customer support session.

Group Counts

To detect events, counts may be computed from groups of customer support sessions, such as a test group and a baseline group of customer support sessions. For each group, counts may be computed that take into account both the topic of a customer support session and customer parameters of the customer support session.

FIG. 7 illustrates example counts for a group of customer support sessions. The counts are represented as a matrix where the rows correspond to customer parameters and the columns correspond to topics. The counts may be initialized with zeros. For each customer support session in the group, one or more topics may be determined for the session (e.g., corresponding to the largest values of a topic vector corresponding to the session) and customer parameters may be selected that correspond to the session (e.g., by selecting all of the customer parameters with a value of true). The corresponding elements of the matrix may then be incremented by one. For example, where a session corresponds to two topics and three customer parameters, six elements of the count matrix may be incremented by one (the six elements corresponding to one of the topics and one of the customer parameters).

After processing all of the customer support sessions in the group, the count matrix may appear as in FIG. 7. In this example, the counts for topic $T_2$ with customer parameters for Internet subscribers and modem model Z24 have high counts, which may indicate an event relating to customers who have this model of modem.

While the counts are represented here as a matrix, any appropriate representation may be used for the counts. For example, the counts may be stored as a list or as a higher-dimensional matrix or tensor. In some implementations, the count information, such as represented in FIG. 7, may be termed a customer support count profile. The generation of a customer support count profile provides for a filtered, compact representation of the customer support sessions within the given time window. It can be seen that the creation and utilization of the customer support count profile, or similar data structures, provides for streamlined operations for further processing, such as for determining whether events have occurred within the given time window. Operations on the customer support count profile require fewer processing cycles of a computer (or computers) for performing the event detection, and require lower memory utilization within the system to store and work with the customer support sessions. Additionally or alternatively, communications between computers, and/or to an event console or device utilized by a person (e.g., a personal computer, mobile device, or the like) utilize lower communication bandwidth when the customer support count profile or a subset thereof is utilized rather than the raw data of the customer support sessions. In some implementations, a report utilizing the customer support count profile and/or portions thereof may be passed to an event console or another device utilized by a person to provide a convenient snapshot of relevant information from the customer support sessions within the selected time window.

Figures 8, 9:
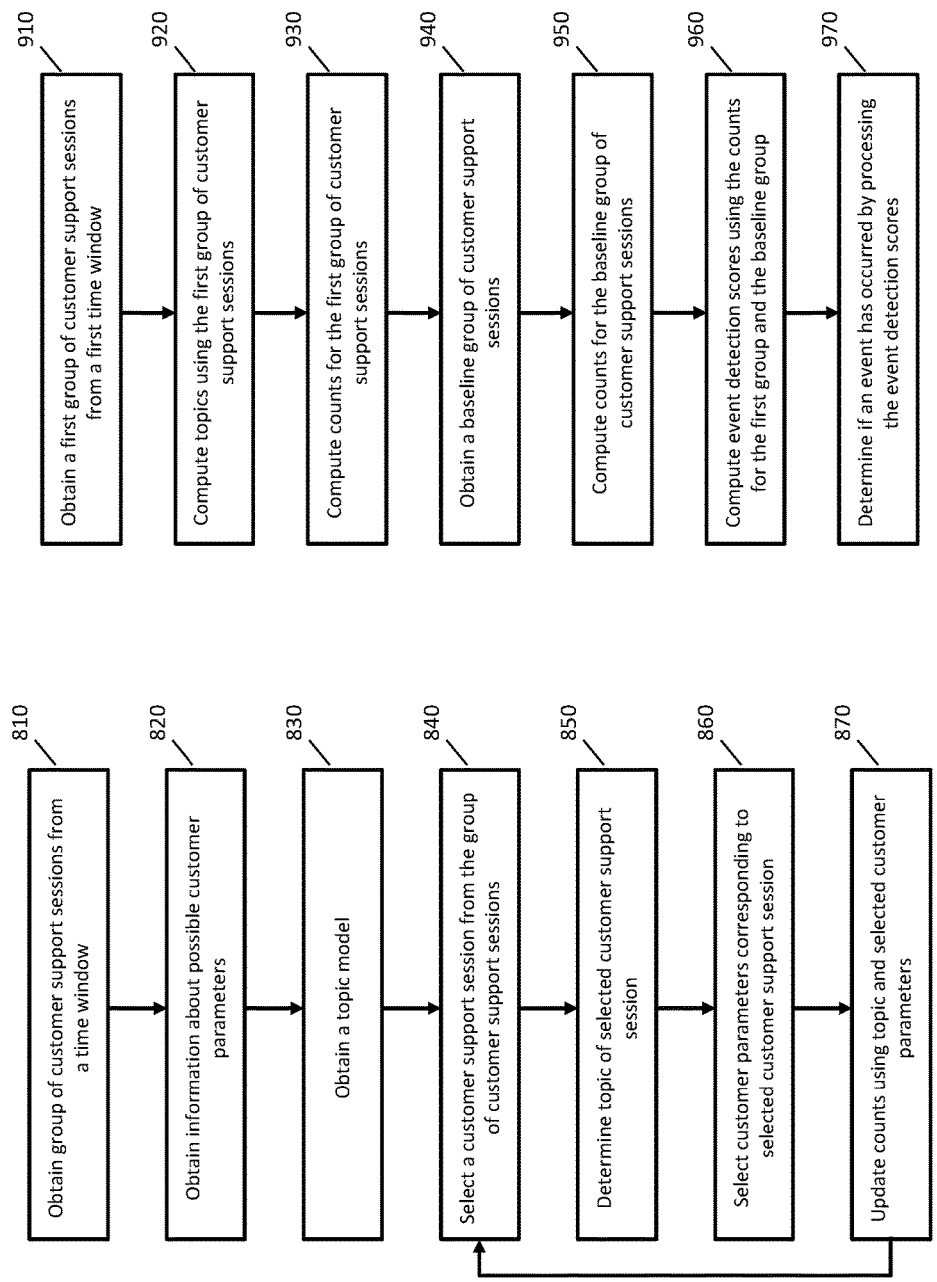
FIG. 8 is a flowchart of an example implementation of computing counts from a group of customer support sessions.
FIG. 9 is a flowchart of an example implementation of detecting an event in a first group of customer support sessions by processing counts for the first group and counts for a baseline group.

FIG. 8 is a flowchart of an example implementation of computing counts for a group of customer support sessions.

At step 810, a group of customer support sessions is obtained. The group may correspond to some or all of the customer support sessions from a time window.

At step 820, information about possible customer parameters is obtained. For example, a list of possible customer parameters may be retrieved from a data store. Any appropriate customer parameters may be used, such as any of the parameters described herein. For example, the customer parameters may include the parameters of FIG. 6.

At step 830, a topic model is obtained such as a topic model specified by a topic matrix described above. The topic model may been previously computed or may have been computed using the group of customer support sessions. The topic model may include background and foreground topics as described above.

At steps 840-870, the group of customer support sessions is processed. Steps 840-870 may be implemented for each customer support session of the group, such as by iterating over the customer support sessions in the group.

At step 840, a customer support session of the group is selected.

At step 850 one or more topics are selected as corresponding to the customer support session using a topic distribution for the selected customer support session. The topic distribution vector may indicate a match between the selected customer support session and each of the topics of the topic model. For example, one topic may be selected corresponding to the largest value of the topic distribution, multiple topics may be selected corresponding to elements of the topic distribution above a threshold, or multiple topics may be selected corresponding to highest valued elements of the topic distribution.

Where the process of FIG. 8 is used to determine counts for a test group, a topic model may be computed at step 830, and during this process, a topic distribution may be computed for each customer support session of the test group. Accordingly, determining a topic may correspond to selecting one or more topics using the topic distribution computed at step 820.

Where the process of FIG. 8 is used to determine counts for a baseline group, the topic model may be one that was computed from a test group, and accordingly, topic distributions may not yet have been computed for the customer support sessions of the baseline group. To compute a topic distribution of a customer support session of the baseline group, a feature vector of the customer support session may be processed as described above (computing an encoder vector, sampling a distribution, and computing a decoder vector) to obtain a decoder vector that represents a topic distribution of the customer support session. This topic distribution may then be used to select one or more topics as described above.

At step 860, a subset of the customer parameters corresponding to the customer support session is selected. For example, all customer parameters having a value of true may be selected.

At step 870, the counts are updated using the selected topics and the selected subset of customer parameters. For example, each count that corresponds to both a selected topic and a selected customer parameter may be incremented by one. In some implementations, where more than one topic is selected for a customer support session, the counts may be incremented using a weight corresponding to each topic. For example, two topics may be selected from the topic distribution where the probability of the first topic is 0.15 and the probability of the second topic is 0.10. The weights of the two topics may be normalized to 1 so that counts corresponding to the first topic are incremented by 0.6 and counts corresponding to the second topic are incremented by 0.4.

After step 870, processing may proceed back to step 840 until all of the customer support sessions in the group have been processed. The resulting counts may appear similar to the counts of FIG. 7.

The process of FIG. 8 may be used for computing both test counts for a test group and background counts for a background group. In some implementations, the process of FIG. 8 may be modified as described below.

In some implementations, a group of customer support sessions may be subdivided in computing the counts. An example will be illustrated for a baseline group, but the same techniques may be used with a test group. A baseline group of customer support sessions may be taken from a time window, such as one year of customer support sessions. The baseline group may be divided into smaller groups, such as a subgroup for each month of the year. The process of FIG. 8 may be performed for each of the subgroups of the baseline group so that 12 sets of counts are computed (one for each month of the year).

The counts of the subgroups may then be processed to determine the baseline counts. For example, the baseline counts may be computed as the average of the counts for each of the subgroups.

In some implementations, the baseline counts may be computed as a moving average of the counts of the subgroups. For example, denote the baseline counts as $B_N$ and the counts for the subgroups as $b_i$ for i from 1 to N. The baseline counts may be computed as the moving average of the M most recent subgroups as follows:

$$B_N = \frac{1}{M} \sum_{i=N-M+1}^{N} b_i$$

In some implementations, the baseline counts may be computed as an exponential moving average of the counts of the subgroups. Denote $\alpha$ as the weight of an exponential moving average filter and the baseline counts may be computed as follows:

$$B_N = \begin{cases} b_1, & N = 1 \\ \alpha b_N + (1-\alpha)B_{N-1}, & N > 1 \end{cases}$$

Any appropriate techniques may be used for computing baseline counts from subgroups of the baseline group. For example, the baseline counts may be computed using a cumulative moving average, a weighted moving average, a moving median, a moving average regression model, or any appropriate filter such as a low-pass filter.

Detecting Events from Counts

The test counts for a test group of customer support sessions and the baseline counts for a baseline group of customer support sessions may be computed using any of the techniques described herein. These counts may be used to detect whether an event has occurred in the test window of the test group.

Denote the test counts as $T_{t,p}$ where t is an index into the possible topics (e.g., foreground and/or background topics) and p is an index into a possible customer parameter. For example, $T_{t,p}$ may be used to represent and access the counts of FIG. 7. Similarly, let $B_{t,p}$ denote the baseline counts.

The test counts and the baseline counts may be processed to determine whether an event has occurred. In some implementations, event detection scores may be computed to determine if an event has occurred. Any appropriate techniques may be used to compute an event detection score. For example, the event detection scores may be computed as a log likelihood ratio for a maximum likelihood estimate, or some other estimate.

In some implementations, event detection scores may be based on modelling the counts using a Poisson prior distribution and may be computed from the counts as follows:

$$S_{t,p} = \begin{cases} T_{t,p} * \log\left(\frac{T_{t,p}}{B_{t,p}}\right) + B_{t,p} - T_{t,p}, & \text{if } T_{t,p} > B_{t,p} \\ 0, & \text{if } T_{t,p} \leq B_{t,p} \end{cases}$$

where $S_{t,p}$ represents the event detection scores. The event detection scores may then be used to determine if an event has occurred. For example, the event detection scores may be compared to a threshold, and if any event detection score is greater than the threshold, then it may be determined that an event has occurred. The example depicts a Poisson prior distribution utilizing the test counts and baseline counts for clarity of illustration. In some implementations, event detection scores may be determined from the counts of one or more of the topics and/or one or more of the customer parameters, and/or functions of these. In some implementations, event detection scores may be determined from values determined in response to the counts, such as a rate of change, persistence, and/or hysteresis of one or more of the counts.

FIG. 9 is a flowchart of an example implementation of detecting events using test counts and baseline counts. FIG. 9 may be implemented, for example, as part of the flowchart of FIG. 2, where the flowchart of FIG. 9 is implemented for successive iterations of FIG. 2.

At step 910, a first group of customer support sessions is obtained from a first time window. For example, the first group may be a test group of customer support sessions.

At step 920, topics are computed using the first group of customer support sessions. The topics may be computed using any of the techniques described herein, such as by using a neural topic model. In some implementations, computing the topics may correspond to extending a set of background topics with a set of foreground topics in the first group.

At step 930, counts are computed for the first group. The counts for the first group may be computed using any appropriate techniques, such as the techniques described by FIG. 8. Each count of the counts for the first group may correspond to a topic and a customer parameter.

At step 940, a baseline group of customer support sessions is obtained from a baseline time window. At step 950, counts are computed for the baseline group, such as by using any of the techniques described herein or at step 930. In some implementations, the same baseline group of customer support sessions may be used for multiple iterations of FIG. 9.

At step 960, event detection scores are computed using the counts for the first group and the counts for the baseline group. Any appropriate techniques may be used to compute the event detection scores, such as any of the techniques described herein.

At step 970, the event detection scores are processed to determine if an event as occurred. Any appropriate techniques may be used, such as any of the techniques described herein. For example, it may be determined that an event has occurred if any of the event detection scores are larger than a threshold. Where it is determined that an event has occurred, an action may be taken, such as logging the event or transmitting a notification.

Many variations of the above processing are possible. In some implementations, the processing of FIG. 9 may be performed using multiple time windows with different widths. Time windows of different widths may perform better in certain situations. For example, where an event has a slow ascent (e.g., a slow increase in the rate of customers requesting customer support for the event) a longer time window may be better for detecting the event. For another example, where an event has a fast ascent, a shorter time window may be preferred so that the event may be detected more quickly.

Multiple test time windows may be used in parallel. For example, three different widths of time windows may be used for test time windows. A first portion of the processing may use test time windows that are 10 minutes long and are advanced by increments of 5 minutes (e.g., time windows of 10:00-10:10, 10:05-10:15, 10:10-10:20, and so forth). A second portion of the processing may use test time windows that are one hour long and are advanced by increments of 30 minutes. A third portion of the processing may use test time windows that are 24 hours long and advanced by increments of 12 hours. By using multiple window sizes simultaneously, improved performance may be obtained for both slow ascent events and fast ascent events.

Processing of Detected Events

When an event is detected, any appropriate techniques may be used to respond to the detection of the event.

A detected event may be associated with one or more topics and one or more customer parameters. Information about the topics, the customer parameters, and other relevant information (e.g., the date and time of the event, a number of customer support sessions corresponding to the topics and/or customer parameters, etc.) may be provided to a person. For example, a message (e.g., an email or a text message) may be transmitted to a person or information about the event may be presented on a dashboard or a console.

Because the topics are learned from the customer support sessions, a text description of the topics may not be immediately available for presentation to a person. In some implementations, a topic may be specified by a distribution of words of the vocabulary (determined by the topic model). To present the topic to a person, a number of most frequent words may be selected from the word distribution of the topic. A specified number of most likely words or all words having a probability above a threshold may be selected. For example, the most likely words for a topic could be the following: modem, model, Z24, slow, broken, and light. A person may then review the most likely words of the topic to understand that the event relates to a particular model of a modem that is not functioning properly.

In some implementations, each of the customer parameters may be associated with a text description so that the text description may be presented to a person. For example, a customer parameter that indicates a person is subscribed to Internet services may be associated with a text description of "Customers are subscribed to Internet services."

Accordingly, for a detected event, words of the topics, descriptions of the customer parameters, and any other relevant information may be presented to a person to allow the person to understand the nature of the event.

In some implementations, information about the event may undergo further processing to facilitate understanding of the event by a person. In some implementations, a topic classifier may be used to provide a text description of the topic of a detected event. A topic classifier may process information about the topics and/or customer parameters associated with an event and select a topic category from a set of topic categories. Because the topic categories are created in advance, a description may be provided for each of the topic categories.

Any appropriate topic categories may be used, and the topic categories may be specified by people from a company (e.g., people in charge of customer support who are aware of likely events). For example, topic categories may relate to the following: modem malfunction, router malfunction, telephone malfunction, Internet service disruption, cable TV service disruption, or phone service disruption. Each topic category may be associated with a description, such as "Internet service is disrupted," for presentation to a person.

A topic classifier may be implemented using any appropriate classifier, such as a support vector machine or a multinomial logistic regression classifier. The topic classifier may be trained by annotating existing customer support sessions with one or more topic categories and/or customer parameters and then training the topic classifier using the annotated customer support sessions.

After an event has occurred, the topics corresponding to the event may be processed with the intent classifier to select one or more of the topic categories as corresponding to the event. The descriptions of the selected topic categories may then be presented to a person. For example, where a modem is malfunctioning, the following report of the event may be presented to a person Event Time: Feb. 27, 2018 from 4:40 PM to 4:45 PM
We have received reports that an Internet modem is malfunctioning. (3,287)
Customers affected by this event include:
Current customers (3,278)
Internet subscribers (3,254)
Renters of modem model Z24 (1,912)
Owners of modem model Z24 (1,091)

The first line of the report may be obtained, for example, from the time window of the test group being processed. The second line may be a text description of a topic category that was obtained by processing the topics with the topic classifier. The last four lines may be customer parameters associated with the event. Each of the numbers in parentheses may be obtained from the test counts.

The report may be presented to a person using any appropriate techniques, such as sending a message or presenting the information on a dashboard. The person receiving the report may then take action, such as reviewing recent actions relating to modem model Z24 and taking steps to remedy the modem malfunction. It can be seen that the operations of the systems and methods of the present disclosure, including the topic classifier and/or the intent classifier, provide for an improved user interface that provides for rapid detection, categorization, response to, and processing of an event. The parameters determined for a report, for example as described herein, can be utilized in any operation to provide alerts, useful graphics or terminology, and/or data (e.g., # of affected customers or devices) to selected persons or groups for enhancing a response to an event.

Implementation

Figure 10:
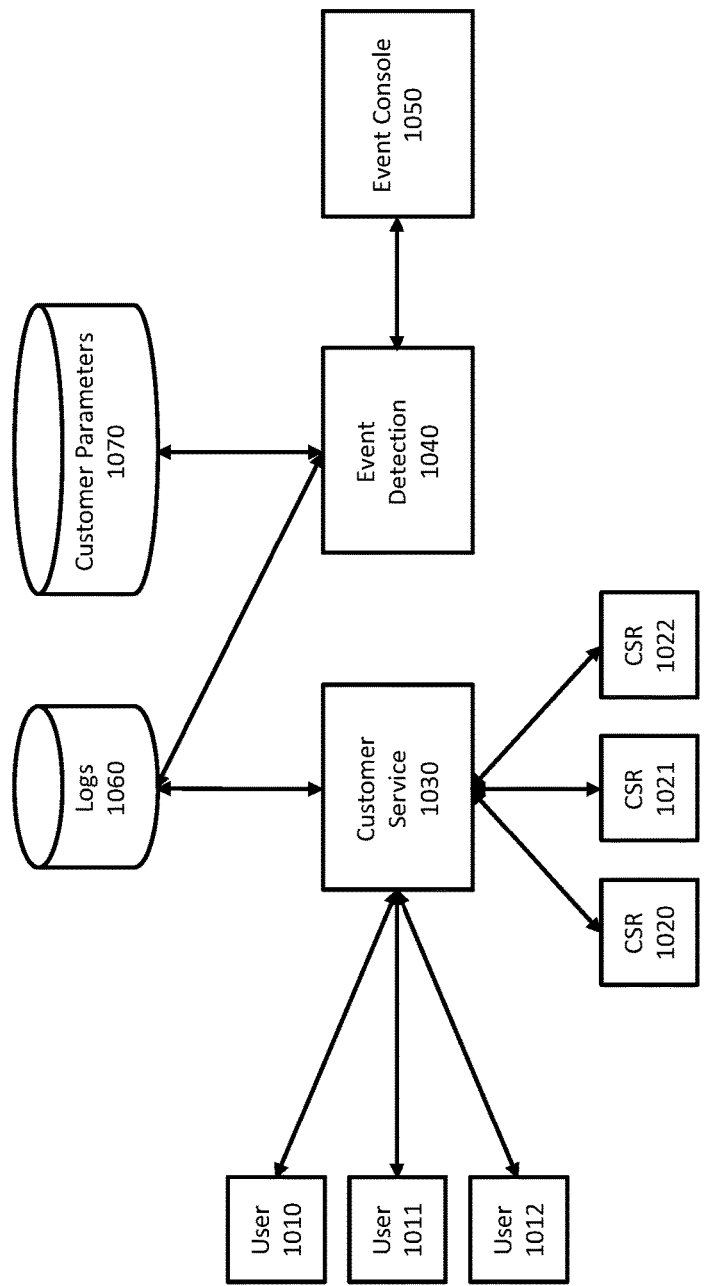
FIG. 10 is an example system for detecting events by processing customer support sessions.

FIG. 10 is an example system that may be used by a company (or at least in part by a third-party company providing services to companies) to detect events by processing customer support logs. The system of FIG. 10 may be implemented in a variety of ways, and the system of FIG. 10 is exemplary and not a limiting example. For example, other components may be added, components may be removed or merged, and connections between components may be added or removed.

In FIG. 10, user 1010, user 1011, and user 1012 may be customers of the company who are communicating with the company or users who may become customers of the company. Each of the users may communicate with the company using any appropriate techniques, such as by sending messages in text format or by voice. Where a customer is communicating by voice, the company may perform automatic speech recognition to obtain text of the communications to facilitate further processing.

Customer service component 1030 may provide any appropriate functionality relating to customer service, such as providing a user interface to a customer device, connecting a customer to a customer service representative (CSR) (such as CSR 1020, CSR 1021, or CSR 1022), or providing automated responses to customer requests. A group of interactions between a customer and the company (which may be using a CSR or automated responses) may be referred to as a customer support session, and customer service component 1030 may store information about each customer support session in logs data store 1060. Any appropriate information may be stored in logs data store 1060, such as text of communications, an identifier of the customer, a time and date of the session, and any other relevant information about the customer or the session.

Event detection component 1040 may detect events by processing customer support logs, such as by using any of the techniques described herein. For example, event detection component 1040, may obtain customer support sessions from logs data store 1060, obtain information about customer parameters from customer parameters data store 1070, identify topics in customer support sessions, compute baseline counts for a baseline window, compute test counts for a test window, compute event detection scores, detect if an event has occurred, and cause information about a detected event to be presented to a person. In some implementations, event detection component 1040 may cause information about a detected event to be presented on event console 1050 for presentation to a person.

Figure 11:
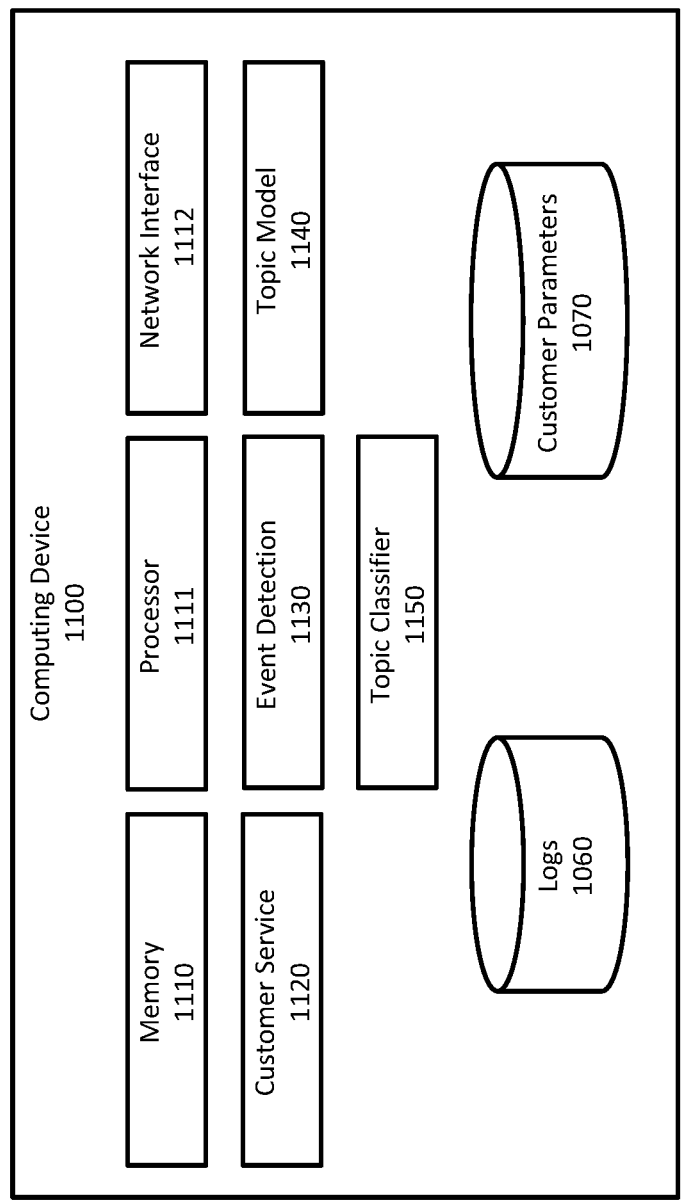
FIG. 11 is an exemplary computing device that may be used to detect events by processing customer support sessions.

FIG. 11 illustrates components of one implementation of a computing device 1100 for implementing any of the techniques described above. In FIG. 11, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1100 may include any components typical of a computing device, such as volatile or nonvolatile memory 1110, one or more processors 1111, and one or more network interfaces 1112. Computing device 1100 may also include any input and output components, such as displays, keyboards, and touch screens. Computing device 1100 may also include a variety of components or modules providing specific functionality, and these components or modules may be implemented in software, hardware, or a combination thereof. For example, computing device 1100 may include any of customer service component 1120, event detection component 1130, topic model component 1140, or topic classifier component 1150, that may perform any of the functionality described above. Other implementations may include additional components or exclude some of the components.

Computing device 1100 may include or have access to various data stores, such as logs data store 1060 and customer parameters data store 1070. Data stores may use any known storage technology such as files, relational or non-relational databases, or any non-transitory computer-readable media.

Figure 12:
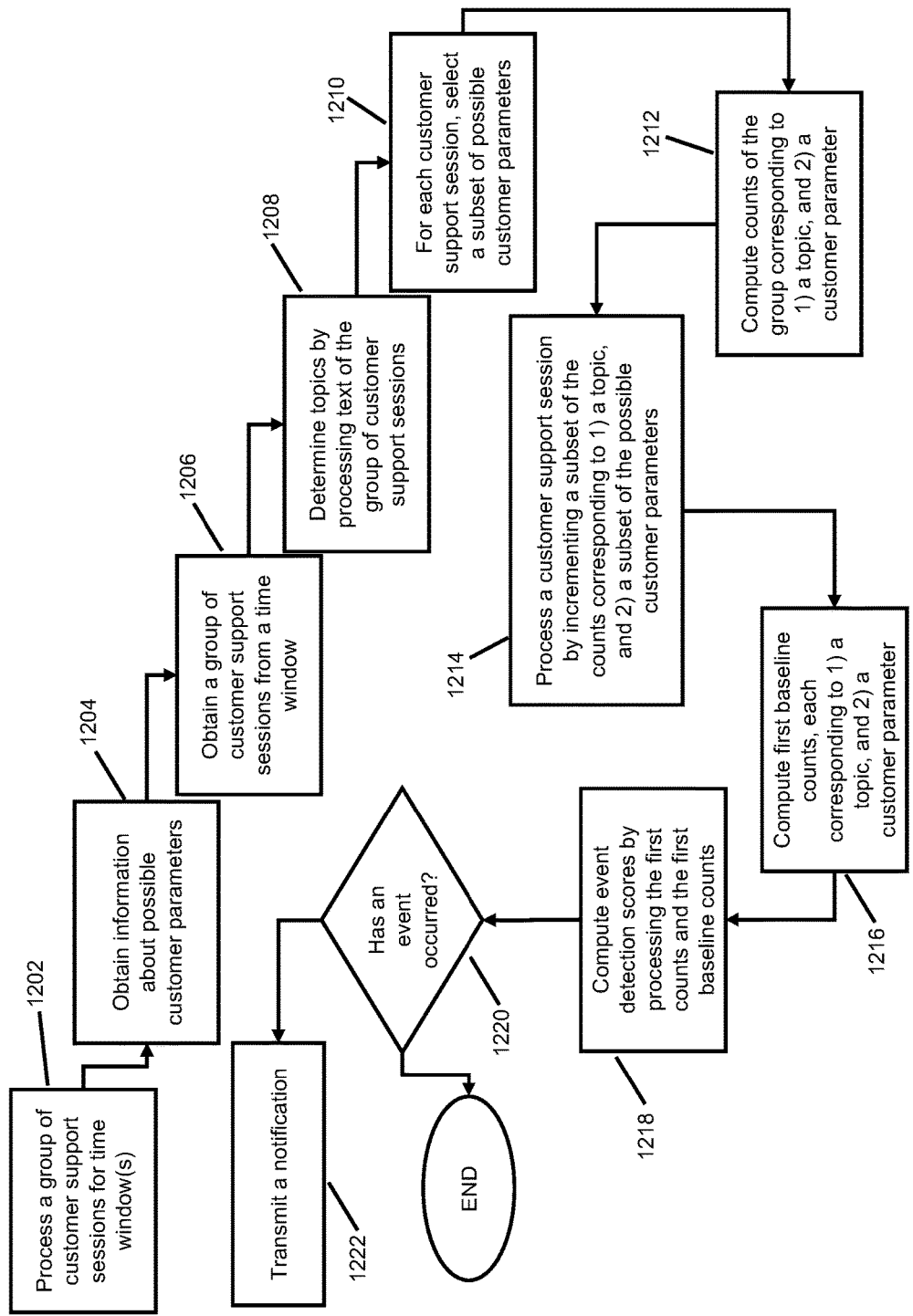
FIG. 12 is a flowchart of an example implementation of determining whether an event has occurred from a group of customer support sessions for a time window.

FIG. 12 is a flowchart referencing example operations to determine if an event has occurred, and/or to determine that an event has not occurred in a selected time window. Operations of the flowchart in FIG. 12 may be performed by any of the systems and/or according to any of the methods described throughout the present disclosure. At step 1202, a group of customer support sessions are processed for a time window, for example to divide a total number of customer support sessions into time window groupings, including potentially certain customer support sessions that may overlap into more than one time window. Operations of FIG. 12 may be performed sequentially on each of a number of time windows as described throughout the present disclosure, and one or more operations of FIG. 12 may be omitted altogether, or omitted during subsequent operations (e.g., steps 1202 and 1204 may be performed once, and the remaining operations performed multiple times before steps 1202 and 1204 are performed again). At step 1204, information about possible customer parameters for the group of customer support sessions is obtained, for example and without limitation in accordance with operations of step 820 (reference FIG. 8). At step 1206, a group of customer support sessions may be obtained in accordance with a selected time window, for example according to step 910 (reference FIG. 9). At step 1208, topics for the time windowed group of customer support sessions are determined by processing the text of the time windowed group of customer support sessions, for example according to step 920 (reference FIG. 9).

At step 1210, a subset of the possible customer parameters is selected for each customer support session, for example according to step 860 (reference FIG. 8). At step 1212 counts for the time windowed group of customer support sessions are determined according to topics and customer parameters. Step 1212 may include, for example, at step 1214 a customer support session is processed by incrementing the counts such as according to steps 840 to 870 (reference FIG. 8). The counts computed from steps 1212 and 1214 may be referenced as a customer support count profile. At step 1216, baseline counts are determined according to any operations described throughout the present disclosure. Operations of step 1216 may be performed during each iteration of the FIG. 12 flow operations, and/or may be determined periodically according to any operations described herein, and step 1216 may additionally or alternatively be performed as a lookup of a predetermined baseline count from a previous iteration of operations of FIG. 12, and/or as determined separately from operations of FIG. 12.

At step 1218, event detection scores are determined according to the baseline counts and the customer support count profile (and/or the accumulated counts according to steps 1212 and 1214). Event detection scores may be based upon individual counts and/or pairs, subsets, or groups of the counts, in accordance with any operations described throughout the present disclosure. In some implementations, event detection scores may be based upon normalized values—for example enabling comparisons for varying sizes of time windows, varying confidence between contributors to the event detection, varying numbers of customer support sessions embodied in a time window and/or within a baseline group of customer support sessions, and/or according to any other operations described throughout the present disclosure. At step 1220, a determination is made whether one or more events are indicated as occurring within the time windowed group of customer support sessions, for example by comparing event detection scores with threshold values, and/or according to any other operations described throughout the present disclosure. In response to detection of an event, at step 1222 the event detection is communicated to a person and/or a device by transmitting a notification about the event. It will be understood that, in some implementations, an event detection may not be transmitted (e.g., where an event is continuing, and/or in accordance with notification preferences indicated by a client of the event detection and/or entered at an event console), and/or the lack of an event detection may be transmitted (e.g., where the end of an event may be significant, and/or in accordance with notification preferences).

Figure 13:
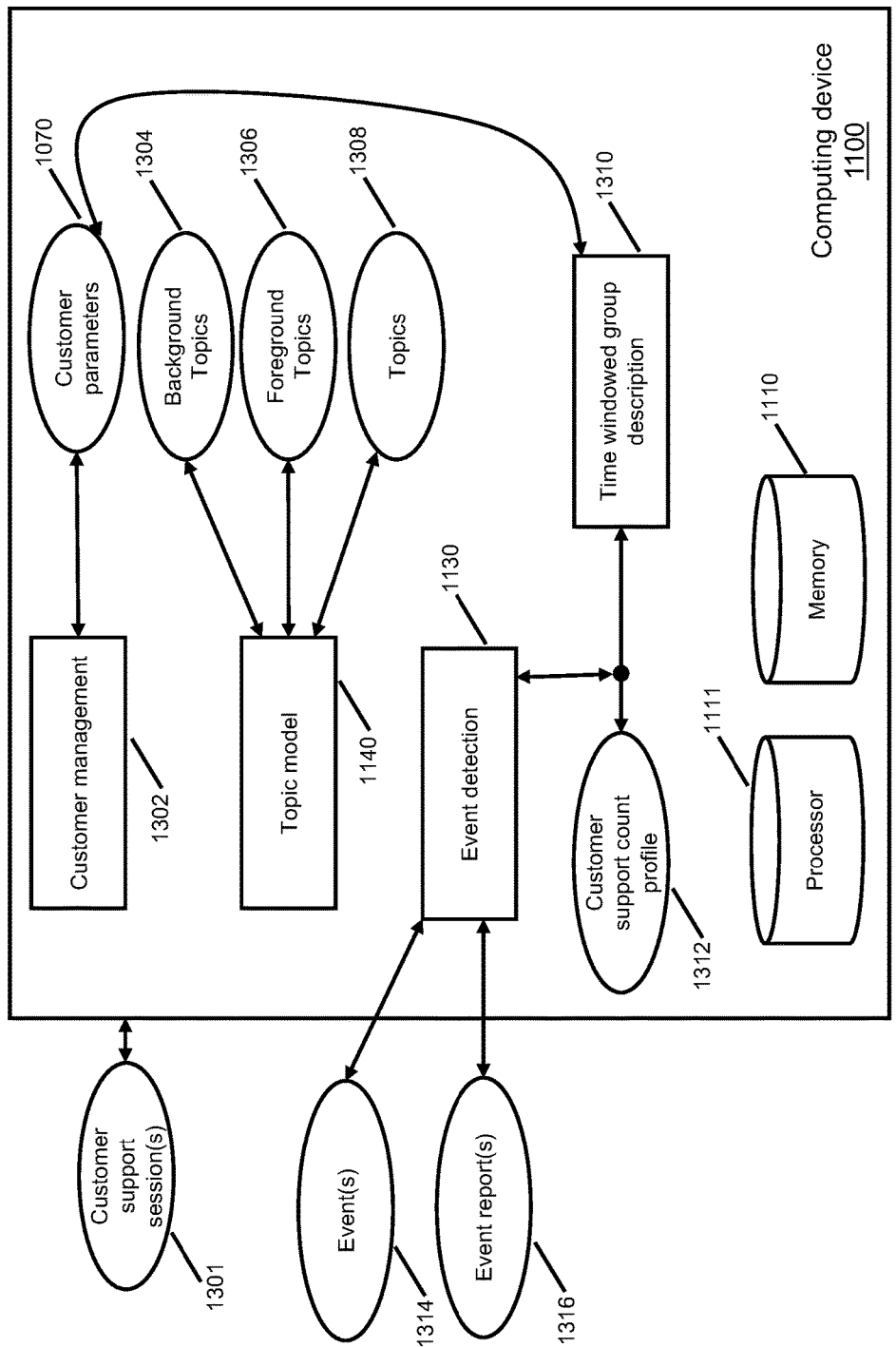
FIG. 13 is an exemplary computing device that may be used to detect events by processing customer support sessions.

Referencing FIG. 13, an example apparatus is depicted that determines a customer support count profile 1312, provides an event notification 1314, and/or provides an event report 1316. The example apparatus is depicted operating on a computing device 1100. As described throughout the present disclosure, operations of the apparatus may be distributed across a number of computing devices, and/or one or more operations of the apparatus may be performed by any other systems or components described throughout the present disclosure. Computing device 1100 includes a customer management component 1302 that processes a group of customer support sessions 1301—for example to determine possible customer parameters within the group, to generate time windowed groups of the customer support sessions 1301, and/or to determine customer parameters from the possible customer parameters that are found within the time windowed groups of the customer support sessions 1301.

Computing device 1100 further includes a topic model component 1140 that determines topics 1308 found within a time windowed group of the customer support sessions 1301. In some implementations, the topic model component 1140 utilizes both foreground topics 1306 (e.g., determined in situ from the customer support sessions 1301) and/or background topics 1304 (e.g., predetermined and/or determined from a baseline group of customer support sessions 1301) to determine the topics 1308. Any operations utilizing foreground topics 1306 and background topics 1304, and/or for determining the topics 1308, described throughout the present disclosure are contemplated herein for operations of the topic model component 1140. Computing device 1100 further includes a time windowed group description component 1310 that determines a customer support count profile 1312—for example by incrementing counts of the topics 1308 and customer parameters that appear in the time windowed group of customer support sessions. The customer support count profile 1312 may be provided to other components in a system, for example to the event detection component 1130, and/or communicated or transmitted in whole or part for display (e.g., to a person, manager, event console, mobile device, etc.), further processing, and/or longer term data storage. Computing device 1100 further includes an event detection component 1130 that determines whether an event has occurred, and/or transmits an event notification 1314 for display (e.g., to a person, event console, etc.). In some implementations, event detection component 1130 transmits an event report 1316 in response to a detected event. Any operations described throughout the present disclosure to detect an event are available to the event detection component 1130, including at least utilization of baseline counts and a comparison to the customer support count profile 1312. Any descriptions of an event report 1316 described throughout the present disclosure are available as configurations for the event report 1316 provided by the event detection component 1130.

Figure 14:
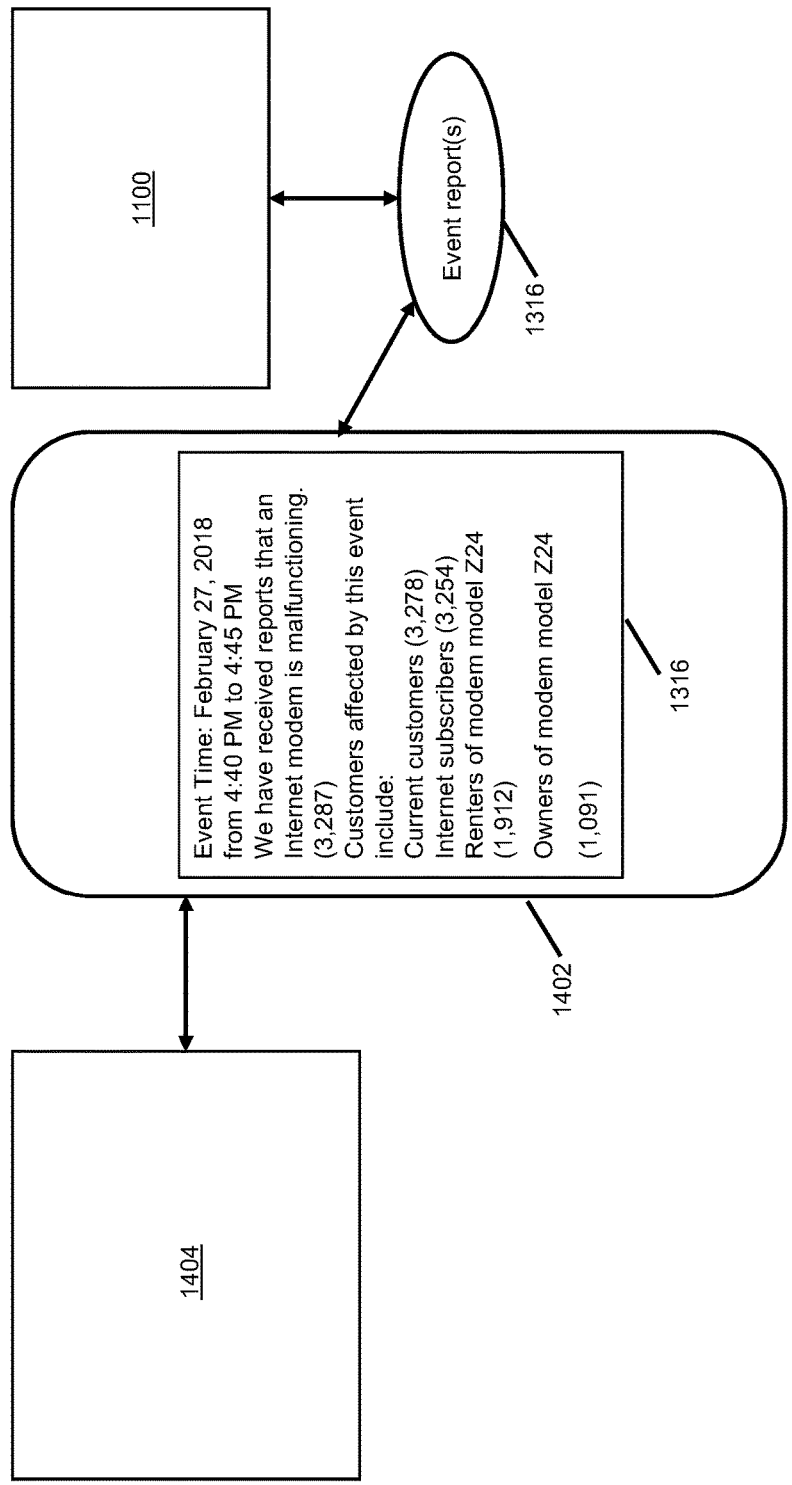
FIG. 14 is an example event report transmitted to a user device.

Referencing FIG. 14, an example computing device 1100 is schematically depicted that provides an event report 1316, for example to a user device 1402. User device 1402 may be any device accessible to a user, and is depicted as a mobile device in a non-limiting example. In some implementations, user device 1402 may be an event console 1050. In some implementations, a further device 1404 is depicted receiving the event report 1316. The further device 1404 may be a computing system for a client of the data (e.g., a company that is a customer of the entity operating the computing device 1100), a long term storage facility, or other device. In some implementations, the customer support count profile 1312 and/or portions thereof may additionally or alternatively be passed to the user device 1402 and/or the further device 1404. The example of FIG. 14 depicts the user device 1402 passing the event report 1316 to the further device 1404, for example to allow for screening, addition of information to the report, etc. In some implementations, computing device 1100 may additionally or alternatively communicate directly with the further device 1404.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a method on the machine, as a system or apparatus as part of or in relation to the machine, or as a computer program product embodied in a computer readable medium executing on one or more of the machines. The processor may be part of a server computer, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware.

The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A system, comprising at least one server computer with at least one processor and at least one memory, the at least one server computer configured to:
   obtain a group of customer support sessions, wherein the group of customer support sessions occurred during a time window;
   determine a plurality of topics by processing text of the group of customer support sessions with a neural network, wherein each customer support session is associated with a topic of the plurality of topics;
   for each customer support session of the group of customer support sessions, select a subset of customer parameters that correspond to the customer support session;
   process the group of customer support sessions to generate a customer support count profile wherein:
   each count of the customer support count profile corresponds to (i) a topic of the plurality of topics and (ii) a customer parameter of the customer parameters, and
   each customer support session of the group of customer support sessions is processed to increment counts of the customer support count profile corresponding to a topic of the customer support session and a subset of the customer parameters selected as corresponding to the customer support session;
   determine that an event has occurred during the time window by processing the customer support count profile.

2. The system of claim 1, wherein the at least one server computer is configured to provide information about the event to an event console.

3. The system of claim 1, wherein the at least one server computer is configured to:
   compute baseline counts, wherein each baseline count of the baseline counts corresponds to (i) a topic of the plurality of topics and (ii) a customer parameter of the customer parameters;
   compute event detection scores by processing the customer support count profile and the baseline counts, wherein each event detection score of the event detection scores corresponds to (i) a topic of the plurality of topics and (ii) a customer parameter of the customer parameters; and
   determine that the event has occurred using the event detection scores.

4. The system of claim 3, wherein the at least one server computer is configured to compute the event detection scores by computing a maximum likelihood estimate using the customer support count profile and the baseline counts.

5. The system of claim 1, wherein the at least one server computer is configured to:
obtain a second group of customer support sessions, wherein the second group of customer support sessions occurred during a second time window;
determine a second plurality of topics by processing text of the second group of customer support sessions with the neural network, wherein each customer support session of the second group of customer support sessions is associated with a topic of the second plurality of topics;
for each customer support session of the second group of customer support sessions, select a subset of customer parameters that correspond to the customer support session;
process the second group of customer support sessions to generate a second customer support count profile;
determine that no events occurred during the second time window by processing the second customer support count profile.

6. The system of claim 1, wherein the at least one server computer is configured to, in response to determining that the event occurred, cause information to be presented to a person, the information comprising two or more of:
a date and time of the event;
words of a topic corresponding to the event;
a description of a topic category corresponding to the event;
a description of customer parameters corresponding to the event; or
a number of customer support sessions corresponding to the event.

7. The system of claim 1, wherein the at least one server computer is configured to determine the plurality of topics by processing the group of customer support sessions with a neural topic model.

8. The system of claim 1, wherein the at least one server computer is configured to:
process a topic corresponding to the event with a topic classifier to obtain a topic category; and
cause information about the topic category to be presented to a person.

9. A computer-implemented method comprising:
obtaining a group of customer support sessions, wherein the group of customer support sessions occurred during a time window;
determining a plurality of topics by processing text of the group of customer support sessions with a neural network, wherein each customer support session is associated with a topic of the plurality of topics;
for each customer support session of the group of customer support sessions, selecting a subset of customer parameters that correspond to the customer support session;
processing the group of customer support sessions to generate a customer support count profile wherein:
each count of the customer support count profile corresponds to (i) a topic of the plurality of topics and (ii) a customer parameter of the customer parameters, and
each customer support session of the group of customer support sessions is processed to increment counts of the customer support count profile corresponding to a topic of the customer support session and a subset of the customer parameters selected as corresponding to the customer support session;
determining that an event has occurred during the time window by processing the customer support count profile.

10. The computer-implemented method of claim 9, comprising transmitting a notification to at least one of a person or an event console in response to determining that the event occurred.

11. The computer-implemented method of claim 9, wherein:
the computer-implemented method is performed by a third-party company providing services to a company, and
the group of customer support sessions comprise messages from customers of the company.

12. The computer-implemented method of claim 9, wherein determining the plurality of topics comprises:
obtaining a plurality of background topics; and
computing the plurality of topics using the plurality of background topics.

13. The computer-implemented method of claim 9, wherein determining the plurality of topics comprises computing an encoder vector with a first neural network and computing a decoder vector with a second neural network.

14. The computer-implemented method of claim 9, wherein determining the plurality of topics comprises sampling a probability distribution.

15. The computer-implemented method of claim 9, wherein determining the plurality of topics comprises processing the group of customer support sessions with a neural topic model.

16. One or more non-transitory, computer-readable media comprising computer executable instructions that, when executed, cause at least one processor to perform actions comprising:
obtaining a group of customer support sessions, wherein the group of customer support sessions occurred during a time window;
determining a plurality of topics by processing text of the group of customer support sessions with a neural network, wherein each customer support session is associated with a topic of the plurality of topics;
for each customer support session of the group of customer support sessions, selecting a subset of customer parameters that correspond to the customer support session;
processing the group of customer support sessions to generate a customer support count profile wherein:
each count of the customer support count profile corresponds to (i) a topic of the plurality of topics and (ii) a customer parameter of the customer parameters, and
each customer support session of the group of customer support sessions is processed to increment counts of the customer support count profile corresponding to a topic of the customer support session and a subset of the customer parameters selected as corresponding to the customer support session;
determining that an event has occurred during the time window by processing the customer support count profile.

17. The one or more non-transitory, computer-readable media of claim 16, wherein determining the plurality of topics comprises:
obtaining a plurality of background topics; and computing the plurality of topics using the plurality of background topics.

18. The one or more non-transitory, computer-readable media of claim 16, wherein each topic of the plurality of topics is represented as a distribution of words in a vocabulary.

19. The one or more non-transitory, computer-readable media of claim 16, wherein the actions comprise:
- computing event detection scores by processing the customer support count profile, wherein each event detection score of the event detection scores corresponds to (i) a topic of the plurality of topics and (ii) a customer parameter of the customer parameters; and
- wherein determining that the event has occurred comprises comparing the event detection scores to a threshold.

20. The one or more non-transitory, computer-readable media of claim 16, wherein the actions comprise providing an event report to an event console in response to determining that the event has occurred.

\* \* \* \* \*

UNITED STATES PATENT AND TRADEMARK OFFICE
CERTIFICATE OF CORRECTION

PATENT NO. : 10,334,106 B1
APPLICATION NO. : 16/124881
DATED : June 25, 2019
INVENTOR(S) : Shawn Henry Page 1 of 1

It is certified that error appears in the above-identified patent and that said Letters Patent is hereby corrected as shown below:

In the Specification

In Column 5, Line 54, before "matrix" delete "of".

In Column 7, Line 67, delete "$h_{enc}\text{-}\Phi(W_{enc}x+b_{enc})$" and insert -- $h_{enc}=\Phi(W_{enc}x+b_{enc})$ --, therefor.

In Column 8, Line 3, after "$W_{enc}$" insert -- is --.

In Column 12, Line 25, delete "are are" and insert -- are --, therefor.

Signed and Sealed this
Twenty-fifth Day of February, 2020

Andrei Iancu
*Director of the United States Patent and Trademark Office*